UNITED STATES PATENT OFFICE.

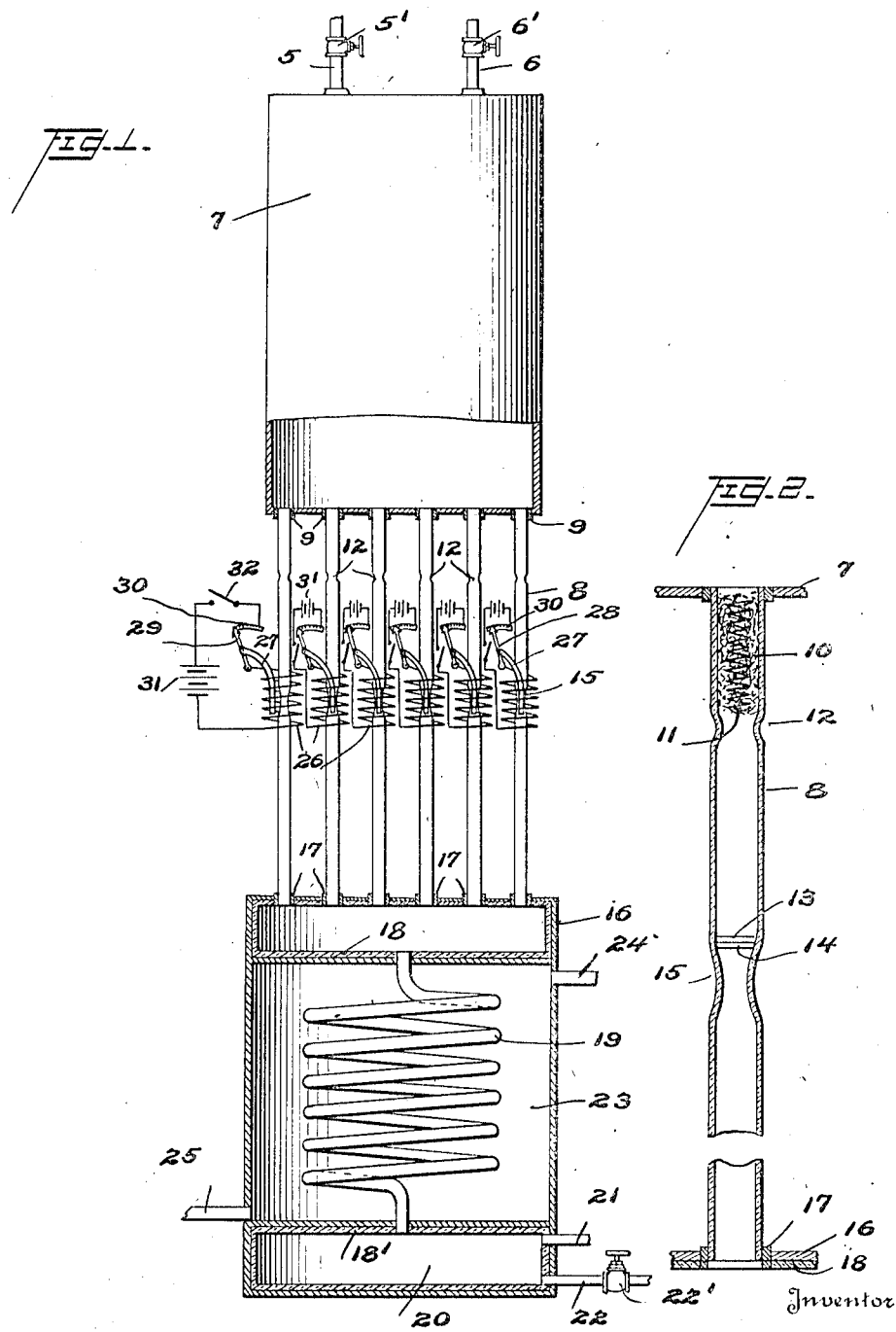

ABRAHAM HENWOOD, OF CYNWYD, PENNSYLVANIA.

PROCESS OF THE OXIDATION OF AMMONIA TO NITRIC ACID.

1,309,622.  Specification of Letters Patent.  Patented July 15, 1919.

Application filed July 11, 1917. Serial No. 179,804.

*To all whom it may concern:*

Be it known that I, ABRAHAM HENWOOD, a citizen of the United States, residing at Cynwyd, in the county of Montgomery and State of Pennsylvania, have invented a certain new and useful Process of the Oxidation of Ammonia to Nitric Acid, of which the following is a specification.

The purpose of my invention is to secure a maximum yield of nitric acid of maximum concentration from the oxidation of ammonia gas.

A further purpose is to maintain a high partial pressure of oxygen in an oxygen and ammonia gas mixture, aiming to keep the pressure of oxygen up to not less than two thirds of the total gas pressure of the mixture.

A further purpose is to use a pressure of oxygen at least equal to twice the ammonia pressure.

A further purpose is to pass an excess of oxygen through, along with the ammonia gas and oxygen required for the compound formed, in order to increase the speed of the formation of concentrated nitric acid.

A further purpose is to utilize pure oxygen for combination with ammonia gas to produce nitric acid and increase the relative oxygen content to increase the speed of combination.

Further purposes will appear in the specification and in the claims hereof.

I have preferred to illustrate the apparatus for practising my invention by but one form, intended to comply with the statute but recognized by me as being but one of the many available for practising the broader embodiments of my invention.

Figure 1 is a diagrammatic view showing apparatus partly in vertical section and partly in elevation of one embodiment of my invention.

Fig. 2 is an enlarged vertical section of one of the tubes seen in Fig. 1.

In the various efforts made to oxidize ammonia gas to nitric acid, no process has yet appeared in which the entire ammonia gas or even a large percentage thereof has been formed into concentrated nitric acid. Each inventor has recognized either that the acid formed was itself dilute or that other nitrogen compounds were produced.

Moreover, whenever it has been suggested that oxygen be used in the process instead of air or other oxygen bearing gas, these various gases have been treated as full equivalents without recognition of the fact, which I have discovered, that the ratio of oxygen pressure to the total gas pressure and specifically to the ammonia pressure has a very important bearing upon the speed of the action and also upon the character of the combination or combinations formed.

In the previous efforts where oxygen has been suggested at all, the inventor has taught also the simultaneous production of other products, variously and loosely stated as "nitrogen oxids" and "other useful ammonia salts," attention being directed to stopping the formation of free nitrogen rather than complete change into nitric acid. The production of other ammonia products simultaneously with formation of nitric acid is inherently prejudicial to production of concentrated nitric acid.

My invention is directed primarily to the maintenance of so large a ratio of oxygen pressure to the total pressure of the gases brought together, that other nitrogen compounds will be substantially eliminated, the speed of operation greatly increased and highly concentrated nitric acid will be formed.

I do not herein claim the catalyzer and its support set forth herein, or its arrangement of the same relatively to the gas passage, or the process of catalytically combining oxygen and ammonia gas to form nitric acid by passing the mixture through such a catalyzer, or the process of regulating the temperature at the point of reaction, as these are set forth in other applications, including Serial No. 241,724, filed June 25, 1918; Serial No. 243,758, filed July 8, 1918; and Serial No. 270,409, filed January 9, 1919.

My investigations have led me to believe that the actual nitric acid produced in the various processes to which reference has been made was relatively small, notwithstanding that the inventors represent that a considerable quantity has been secured. It is probable that the reaction taking place is in large measure not a combination of $$NH_3 + 2O_2 = HNO_3 + H_2O \quad (1)$$

the stoicheiometrical proportion which is desired, but chiefly $$2NH_3 + 3O_2 = 2HNO_2 + 2H_2O = NO_2 + NO + 3H_2O \quad (2)$$

In my experiments under conditions corresponding to those set forth in the old processes $NO_2$ was obtained but the water condensate had so little $HNO_3$ in it that there was practically no action when it was poured on a fragment of copper wire.

The oxidation in equation (1) is strongly exothermic, evolving over 80,000 calories per gram-mol of ammonia. It is therefore a self-sustaining action in the same sense that combustion of carbon in oxygen is self-sustaining; but reaction (1) requires initial heating of the catalyzer to start it.

I have discovered that my condition of high proportionate pressure of oxygen as compared with the total pressure, so desirable for speed and so necessary for a maximum percentage and maximum concentration of nitric acid may be attained at the same time that the catalyst is kept cooled to or below a glowing heat by providing enough excess oxygen to act as a cooling agent, which excess oxygen is ultimately recovered from the discharge gas or gases.

The pressure of the combined gas or combining gases directly affects both the speed of reaction and the temperature at which the reaction takes place. Increase of pressure, therefore, attains a greater speed of reaction and quantity of resultant nitric acid and reduction of pressure lowers the speed of reaction and at the same time the temperature at which the reaction takes place. Excessive increase and reduction of temperature both have their objections, in that the higher temperature due to excessive pressure, will cause dissociation of the nitric acid and excessive reduction of pressure increases the danger of explosion.

I find that very close temperature control can be attained, (at the same time that the control becomes automatic) by gas cooling to a point where an outside thermostatically-regulated heating agent may be applied to add the little occasional heat required. In other words it is easier to heat automatically with thermostatic control than to cool automatically subject to the same control; and outside means, such as an electric current, can be controlled more easily and with greater delicacy than inside means comprising part only of the gas flow.

Remembering that nitric acid decomposes at moderately high temperatures, as shown by the following equation $$4HNO_3 = 2H_2O + 4NO_2 + O_2 \quad (3)$$

it will be seen that it is necessary to carry out reaction (1) at a relatively low temperature to prevent this decomposition. This low temperature requirement indicates also the necessity of finding as active a catalyzer as possible and using very small bulk of it in order that there may not be additional mass to hold the heat.

I have found that platinum sponge is most desirable as a catalyzer where high activity and low temperature are sought at the same time. I know that I am not the first to suggest platinum sponge but in the only other suggested use of it with which I am familiar it was urged in combination with solid continuous platinum whose use would defeat the advantage from the sponge for my purpose.

As I find it desirable to use a quantity of platinum sponge too small to be self-sustaining, I rest it upon a support of other material, preferably non-metallic and a poor heat conductor, such as, for example, alundum.

From equation (1) it may be seen that the speed of forming the nitric acid is proportional to the square of the concentration of the oxygen, i. e. to the square of the partial pressure of the oxygen.

Comparing with other oxidation reactions shown by the formulæ

$$4NH_3 + 3O_2 = 6H_2O + 2N_2 \quad (4)$$
$$2NH_3 + 3O_2 = 2HNO_2 + 2H_2O = NO_2 + NO + 3H_2O \quad (5)$$

it will be seen that high oxygen pressure favors the reaction of formula (1) to a greater extent than it favors these other ammonia oxidation reactions.

Comparing equation (2) with an air-ammonia mixture in theoretical proportions, i. e.

$$NH_3 + 2O_2 + 8N_2 \quad (6)$$

the partial pressure of the oxygen in equation (1) is two thirds of the total pressure, whereas the partial pressure of the oxygen in mixture (6) is but two-elevenths of the total gas pressure, showing three and two third times the oxygen partial pressure in equation (1), as compared with mixture (6).

As the speed at which the reaction takes place is in proportion to the square of the concentration of the oxygen, reaction (1) should take place between thirteen and fourteen times as rapidly as when an air mixture is used. The speed can still further be increased by compressing the mixture to give a higher concentration of reacting material, or by using an excess of oxygen, or both. The use of the excess of oxygen is desirable also, as indicated, in cooling the catalyzer.

In practice, with my preferred apparatus illustrated, the ammonia gas is dried before use and it and the oxygen are fed in the desired proportions through inlets 5, 6, controlled by valves 5', 6', into a mixing tank or receiver 7 with which the various reaction tubes 8 are connected, so as to pass the gases through in parallel, by preferably elastic and permissibly rubber sockets 9. Though I prefer to use quartz for the tubes, because of its capacity to withstand rapid temperature change, glass or duriron will give the same general service.

In the upper part of each tube I place asbestos fiber 10, to guard against "back firing". I maintain it in the desired loose condition by wire coils 11. Except as it may be affected by regurgitant nitric acid, almost any kind of wire will answer, but I use nichrome because it is not affected by nitric acid. The asbestos fiber and coil therein may be conveniently supported by a constriction 12 in the tubing.

The best form of catalyzer 13 is a very small mass of platinum sponge, free from massive platinum or other catalyzer and preferably also spaced, at least, from other matter which is adapted to be highly heated and to retain the heat from the reaction taking place at this point. I have found it desirable to rest the catalyzer upon an earthen support 14, such as alundum, which is suitably perforated or otherwise provided with openings to permit flow of gas and nitric acid through it. The alundum is in turn rested upon a constriction 15 in each tube.

The bottom of the tube is sealed into the top of a header 16 by any acid proof cement, such as quartz and silicate of soda, as at 17. The header is suitably lined, as at 18, to withstand the nitric acid. In the illustration the acid is then condensed. This is accomplished by a condenser coil 19 discharging into a receiving compartment 20, similarly lined at 18' and from which gas and nitric acid outlets 21 and 22 extend. Either or both of these may be valved as at 22'.

Cooling liquid is admitted to and withdrawn from the compartment 23 about coil 19 by means of inlet and outlet pipes 24 and 25. Instead of this condensation the gas may be concentrated or otherwise treated by any of the processes known in the art.

To provide for heating the catalyzer initially and adding heat, as may be required to maintain the desired temperature, I indicate a plurality of resistance wire windings 26, each about one of the catalyzers and about the stem of a thermostatic element such as a Bourdon tube 27, whose outer end, insulated at 28, is connected with the arm 29 of a rheostat 30 by which the flow of current from battery 31 is controlled, so as to cut out resistance as the temperature at the thermostat decreases, breaking the circuit altogether at any desired upper limit of temperature. A switch 32 provides for opening the circuit when automatic operation is not required.

It is desirable to have a separate coil, thermostat and rheostat for each of the tubes.

The use of a plurality of tubes relatively increases the surface as compared with the gas capacity of the apparatus, assisting in keeping the temperature within reasonable range at the point of reaction.

In operation:—I begin the process by passing current through the resistance coils until the platinum sponge has been heated up preferably just below the glowing point. The reaction starts and continues with a speed approximating combustion and the gases pass through at a high velocity. The temperature can be regulated entirely by the use of excess oxygen and adjustment of the quantity of excess for selected tube size and quantity of catalyzer, readily determined by experiment, or by varying the gas speed, reducing the quantity of gas (and as a consequence, reducing its pressure) to reduce the temperature. However, a finer adjustment may be obtained and made automatic by the use of sufficient excess oxygen or, less advantageously, sufficiently reducing the gas speed, to keep the temperature bordering on the lower limit of the range of permissible temperatures, utilizing the thermostatic electric control to add heat from time to time as may be required to offset what would otherwise be objectionable depressions of temperature below that at which the reaction takes place most advantageously.

The use of platinum sponge avoids the spasmodic and violent action of platinum black, the excessive heating and consequent backfiring into the asbestos tube due to platinized asbestos and the larger bulks of massive platinum and gauze and the excessive temperature necessary to secure activity of massive platinum and the gauze.

In practice I have obtained nitric acid having 84% of the concentration of the nitric acid of commerce, which percentage can be increased by increase of oxygen pressure to a limit closely approaching that of a "fuming" acid containing 78% of nitric acid.

Having thus described my invention, what I claim as new and desire to secure by Letters Patent is:—

1. The improvement in the art of oxidizing ammonia gas into nitric acid which consists in passing a mixture containing ammonia gas and oxygen over a hot catalyzer while maintaining a partial pressure of oxygen in the mixture of gases used equal to or greater than twice the partial pressure of the ammonia gas used and forming the majority of the total gas pressure.

2. The improvement in the art of oxidizing ammonia gas into nitric acid which consists in passing a mixture containing ammonia gas and oxygen over a hot catalyzer while maintaining a partial pressure of oxygen in the mixture of gases used equal to at least two thirds of the total gas pressure.

3. The improvement in the art of oxidizing ammonia gas into nitric acid which consists in passing a mixture containing ammonia gas and oxygen over a hot catalyzer while maintaining a pressure sufficient to promote rapid reaction but insufficient to cause excessive heating of the catalytic body.

4. The improvement in the art of oxidizing ammonia gas into nitric acid which consists in passing a mixture containing ammonia gas and oxygen over a hot catalyzer while maintaining a pressure sufficient to promote rapid reaction but insufficient to cause heating to a point detrimental to the formation of nitric acid.

5. The method of keeping the temperature of oxidation of ammonia gas to nitric acid low while passing the gases over a hot catalyzer which consists in providing an excess of oxygen above twice the partial pressure of the ammonia gas and forming the majority of the total gas pressure.

6. The method of keeping low the temperature of oxidation of ammonia gas to nitric acid by oxygen, which consists in providing a quantity of oxygen in excess of its stoicheiometrical proportion and reducing the extent by which the pressure of the gas mixture exceeds the atmospheric pressure.

7. The improvement in the art of oxidizing ammonia gas into nitric acid which consists in passing mixed ammonia gas and oxygen over a hot catalyzer consisting exclusively of platinum sponge.

8. The improvement in the art of oxidizing ammonia gas into nitric acid which consists in passing mixed ammonia gas and oxygen over a hot catalyzer consisting exclusively of platinum sponge and supporting the catalyzer upon a non-metallic support.

9. The method of keeping down the temperature in the oxidation of ammonia gas into nitric acid which consists in passing mixed ammonia gas and oxygen over a hot catalyzer of small mass and resting the catalyzer upon a non-catalyzing support.

10. The method of keeping down the temperature in the oxidation of ammonia gas into nitric acid which consists in passing mixed ammonia gas and oxygen over a catalyzer of hot platinum sponge and holding the catalyzer by means of a non-metallic support.

11. The method of preventing back-firing during the oxidation of ammonia gas into nitric acid by the aid of a catalyzer which consists in passing the gases through asbestos fiber between their mixing point and the point at which the reaction takes place.

12. The improvement in the art of oxidizing ammonia gas into nitric acid by the aid of a catalyzer which consists in passing the gases through a number of relatively small reaction tubes arranged in multiple to reduce the size of each reaction tube for the volume of output and reduce the area and mass of each catalyzer used.

ABRAHAM HENWOOD.

Witness:
J. LUTHERIA KAUFFMAN.